United States Patent [19]

Guillaume et al.

[11] Patent Number: 4,630,555
[45] Date of Patent: Dec. 23, 1986

[54] PROCESS FOR INCINERATING WASTE PRODUCTS AT A CONTROLLED TEMPERATURE

[75] Inventors: Paul Guillaume, Ivry-sur-Seine; Didier Kayser, Paris; Jean Propice, Bois d'Arcy, all of France

[73] Assignee: L'Air Liquide, Paris, France

[21] Appl. No.: 860,194

[22] PCT Filed: Dec. 3, 1985

[86] PCT No.: PCT/FR85/00347

§ 371 Date: Mar. 20, 1986

§ 102(e) Date: Mar. 20, 1986

[87] PCT Pub. No.: WO86/03575

PCT Pub. Date: Jun. 19, 1986

[30] Foreign Application Priority Data

Dec. 5, 1984 [FR] France .................... 84 18.508

[51] Int. Cl.[4] .......................................... F23G 5/00
[52] U.S. Cl. .................................................. 110/346
[58] Field of Search ................ 110/346, 235, 248; 431/4

[56] References Cited

U.S. PATENT DOCUMENTS

| | | | |
|---|---|---|---|
| 2,829,610 | 4/1958 | Paskowski | 110/248 |
| 4,354,440 | 10/1982 | McRee, Jr. | 110/346 |
| 4,444,127 | 4/1984 | Sprohz | 110/235 |
| 4,481,891 | 11/1984 | Takeshita et al. | 110/346 X |

Primary Examiner—Edward G. Favors
Attorney, Agent, or Firm—Lee C. Robinson, Jr.

[57] ABSTRACT

The present invention relates to a process and apparatus for incinerating waste products. The apparatus comprising a furnace, in the hearth of which the waste products are charged in a discontinuous manner, is characterized in that it comprises a nozzle (3) for injecting pure oxygen and mechanically or pneumatically spraying a liquid, the nozzle opening into the furnace (1).

9 Claims, 9 Drawing Figures

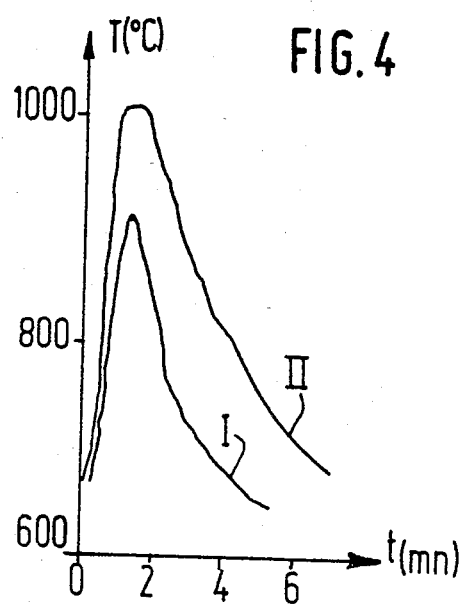 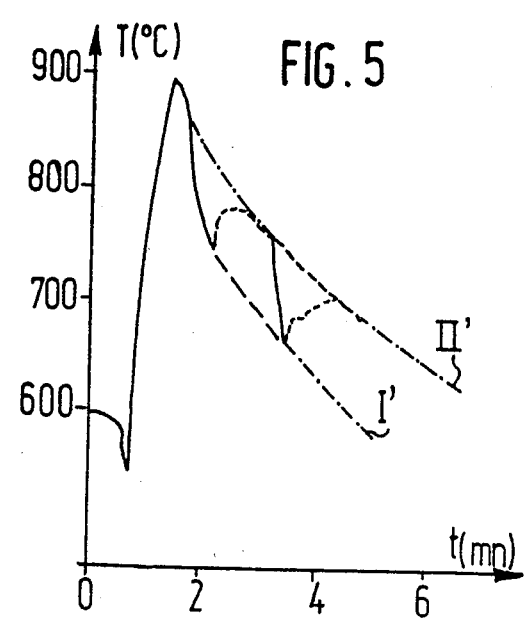
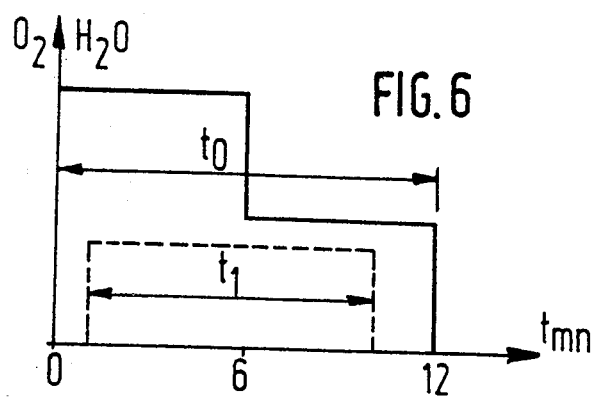
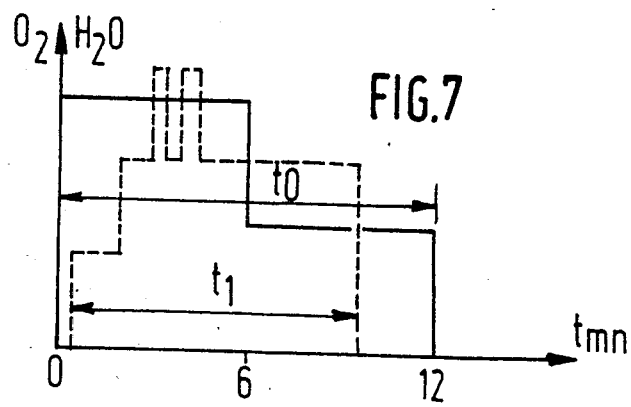

PROCESS FOR INCINERATING WASTE PRODUCTS AT A CONTROLLED TEMPERATURE

DESCRIPTION

The present invention relates to a process and an apparatus for incinerating waste products.

An increasing number of industrial firms or tertiary industries are at present equipped with apparatus for incinerating waste products. The use of such apparatus or incinerators may satisfy a legal obligation (hospitals, slaughter-houses, etc. . . . ) or a desire to achieve an energy valorization of these waste products (supermarkets, etc. . . . ). These apparatus must permit a non-polluting, rapid and economical incineration.

There are at present on the market several types of incinerators whose operation is based on different principles. Among these apparatus, there exist the type employing a continuous charging for treating very large quantities of waste products and the type employing a discontinuous charging for treating charges of small volume. The present invention relates to improvements in the latter type of incinerator. The treating capacity of such apparatus and the operating cost obviously depend on the rate of incineration of the waste products. However, when the combustion of the waste products occurs too rapidly, the temperature of the hearth rises considerably and produces, in addition to an accelerated wear of the refractories, considerable pollution at the outlet of the incinerating apparatus. Indeed, theory and practice show that the content of carbon monoxide in the smoke issuing from the incinerator increases with increase in the temperature of the hearth.

It is known from French Pat. No. 2,316,542 to introduce in a continuous manner waste products in a furnace and to incinerate these products, thereby producing gases above the hearth containing a large amount of carbon monoxide. After the creation of this carbon monoxide, secondary air and water are injected in contact with this smoke so as to produce a post-combustion of the smoke gases and catalytically accelerate the oxidation of the CO in accordance with the reaction of water gas.

Now, the applicant has found that such a process applied to the incineration of charges introduced in succession in the incinerator did not permit a correct elimination of the carbon monoxide and the soot from the smoke which issues from the incineration furnace. Indeed, in order to insure that the reaction of post-combustion of the smoke and of catalytic oxidation of the CO is produced, the smoke must be brought to a temperature on the order of 900° C. to 1000° C., as mentioned in said French patent.

Consequently, as soon as the charge is introduced in the furnace, the hearth must be brought to a temperature on the order of 900° C. to 1000° C. so that the smoke immediately has this temperature and the reaction can take place. Now, it has been found by analysis of the smoke gases that, in fact, if the waste products are introduced at this temperature, a very large quantity of carbon monoxide would be produced.

The applicant believes that the combustion of the waste products in the region of the hearth produces pyrolysis gases of the type $C_n H_n$ which form a cloud above the hearth which comprises in succession, in starting at the hearth, a first layer of gas mainly containing hydrogen, with which soot (carbon particles) is mixed, a second layer of gas mainly containing carbon monoxide and hydrogen, and a third layer of gas mainly containing a mixture of $CO_2$ and $H_2O$ (pyrolysis gases oxidized with air) in contact with the air of the hearth. This last layer forms an envelope around the second and first layers which cannot be oxidized in the air of the furnace. The method disclosed in said patent consists in injecting air into this cloud so as to try to oxidize the gases of the second and first layers. But if it is desired to obtain an intimate contact between the air and these gases, a large quantity of air must be injected so as to create a turbulence and facilitate the oxidation. The temperature of the smoke will thus be reduced (unless the air is pre-heated, which would be particularly complicated). The temperature of the mixture of smoke and injected air will then be too low to insure that the reaction of oxidation of the carbon monoxide is achieved with sufficient kinetics. On the other hand, if less air is injected, the stirring will be insufficient and, in both cases, unacceptable quantities of CO will be found at the outlet of the furnace.

If the temperature of the hearth is reduced when the waste products are introduced, for example to around 600° C. to 700° C., the quantity of carbon monoxide created in the second layer will be smaller, but this carbon monoxide cannot be correctly eliminated by combustion of the smoke since the temperature of this smoke is insufficient. Thus, while less carbon monoxide is produced, there is an unacceptable quantity thereof at the outlet of the furnace.

The applicant has thought that it was possible to introduce the waste products at a hearth temperature on the order of 650° C., then to increase this temperature so as to be able to subsequently produce the post-combustion of the smoke, but there are still large quantities of CO (at the beginning: insufficient temperature of the smoke—then: insufficient and poor adaptation of the action of the mass of injected air). The addition of water by a reaction of water gas does not markedly change the results as concerns the content of carbon monoxide in the smoke at the outlet of the furnace.

The applicant has therefore studied the incineration of waste products by successive charges according to a discontinuous process comprising the opening of the door of the furnace, the introduction of the charge, the closure of the door, the incineration of the charge, the opening of the door, etc. . . . , in respect of which there was posed the problem of the elimination of the carbon monoxide in the course of the incineration but more particularly at the beginning of the incineration.

According to the invention, this problem is solved by applying a process whose successive characteristic steps are the following:

lower the temperature of the furnace to about 650° C.;

introduce the charge to be incinerated;

inject oxygen at least in the region located roughly between the charge and 20 cm above the latter, preferably at sonic velocity so as to immediately oxidize the carbon and the hydrogen formed by cracking the pyrolysis gas above about 450° C., the presence of oxygen very rapidly producing a rise in temperature of the hearth above 750° C., beyond which temperature the carbon monoxide which may possibly be formed is immediately oxidized in the form of carbon dioxide, water being vaporized when the temperature in the furnace becomes higher than about 750° C., by spraying with the aid of the oxygen so as to, on one hand, produce active oxygen by thermal cracking and accelerate the oxidation of C, CO and $H_2$ and, on the other hand, to maintain a temperature in the furnace which does not become substantially higher than about 850° C., by the absorption of heat upon its vaporization.

The injection is carried out preferably at sonic velocity so as to create a highly turbulent zone in said region.

The oxygen and the liquid may be injected into the furnace during an incineration cycle with one and the same respective rate of flow or with a plurality of different successive rates of flow.

Generally, a cycle of incineration of waste products has a duration t (which often varies in practice between 7 min and 21 min), the injection of oxygen being effected during a duration to, while the injection of liquid capable of lowering the temperature in the combustion chamber is carried out during a duration $t_1$.

In all cases, the following relation is satisfied:

$$t \geq to \geq t_1.$$

to and t representing overall durations of injection of oxygen and liquid. These injections may be continuous or discontinuous (pulsatory mode), of constant or variable rate of flow. The duration and/or the magnitude of the injections may be controlled preferably by a measurement of temperature and/or pressure generally in the combustion chamber.

The flow of oxygen may be constant if it is desired to simplify the installation. But it will generally be variable with a higher rate of flow at the beginning of the cycle with respect to the rate of flow at the end of the cycle of incineration so as to rapidly raise the temperature after the introduction of the charge to be burnt (at room temperature). The simplest solution is to have a high flow $D_1$ and a low flow $d_1$ of oxygen, the radio $D_1/d$ preferably varying in the following proportions:

$$1 \leq D_1/d_1 \leq 3.$$

The respective duration of these two flows may be identical. Generally, it is found to be advantageous, from the point of view of the improvement of the ratio duration of the incineration/cost of the incineration, to vary the durations $tD_1$ of high flow $D_1$ and $td_1$ of low flow $d_1$ in the proportions:

$$\tfrac{1}{3} \leq t_{D1}/t_{d1} \leq 2.$$

The flow of liquid is generally the higher as the temperature and/or the pressure in the combustion chamber are high. Preferably, there will be chosen a first flow $DL_1$ above a temperature considered critical Tc (on the order of 900° C.), a second flow $DL_2$ between the critical temperature Tc and Tc—about 50° C. and a third flow $DL_3$ (low flow) between Tc—50° C. and Tc—150° C., the flow of water being eliminated in all cases at the latest when the temperature is around 750° C. in the combustion chamber.

Preferably, the followings limits will be respected:

$$1.1 \leq DL_1/DL_2 \leq 3$$

and $$1 \leq DL_2/DL_3 \leq 2$$

If the incinerator is used normally, liquid at a flow $DL_1$ is injected only under exceptional conditions. This liquid is injected generally at flows $DL_2$ and $DL_3$ which are of the same order of magnitude.

Another object of the invention is to provide an apparatus for incinerating waste products of the type employing a discontinuous charging and a lively combustion, comprising a furnace in the hearth of which the waste products are charged in a discontinuous manner, wherein a nozzle is provided for injecting pure oxygen and mechanically or pneumatically spraying a liquid, this nozzle opening into the furnace.

There will now be described hereinafter, by way of a non-limiting example, one manner of carrying out the invention, with reference to the accompanying drawings, in which:

FIGS. 4 and 5 are diagrams showing the variations of the temperature in the incinerating apparatus with respect to time, in the absence or in the presence of a spraying of water;

FIGS. 6 and 7 are diagrams showing the variation of the flows of the injection of oxygen and the spraying of water with respect to time in the course of the various incineration cycles.

Figure 1A:
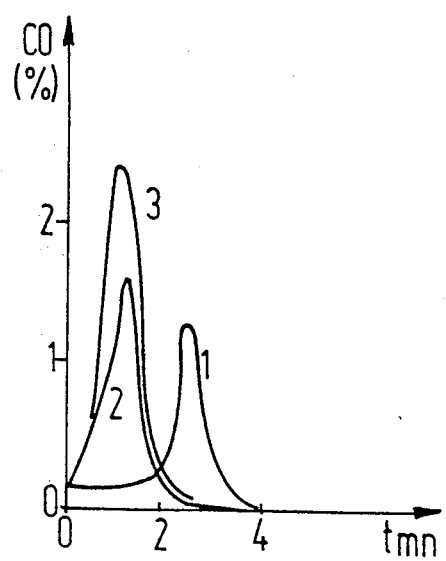
FIGS. 1A, 1B and 1C are diagrams of the contents of carbon monoxide in smoke according to the prior art and according to the invention.

FIG. 1A shows three readings of the content of carbon monoxide in the smoke of incinerators of known type employing a discontinuous charging and a lively combustion, with respect to time, the charge being introduced at t=o. The curves 1, 2 and 3 relate to the temperatures of the hearth when introducing the waste products at 680° C., 800° C. and 900° C. respectively.

These curves clearly show a very great increase in the carbon monoxide content in the smoke when the temperature at which the charge is introduced rises (these three curves have been plotted for charges which are similar in quantity and quality).

Figure 1B:
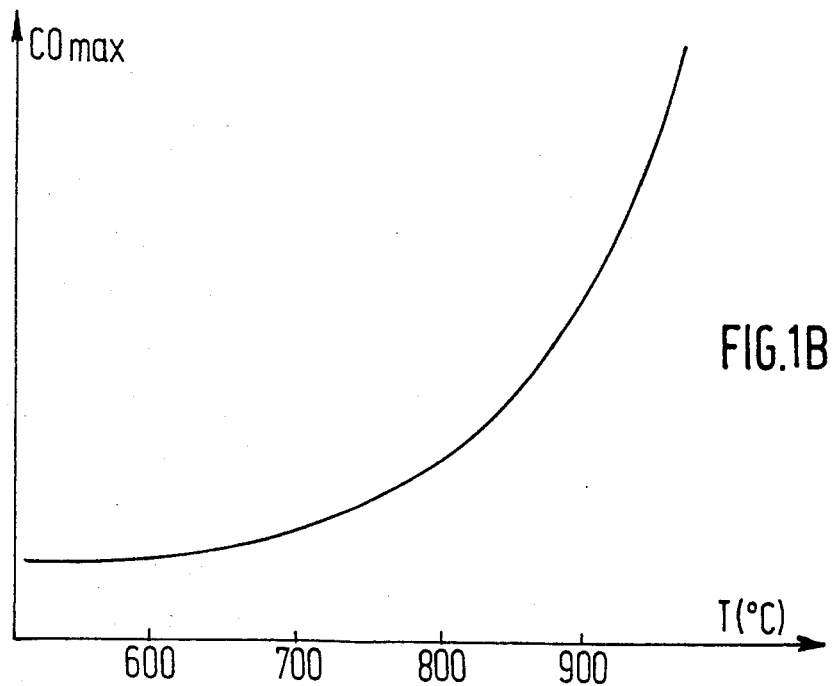

FIG. 1B is a curve representing the variations of the maximum content of carbon monoxide in the smoke as a function of the temperature of the hearth upon introduction, this curve showing the very rapid increase in the content of carbon monoxide beyond 750° C.

Figure 1C:
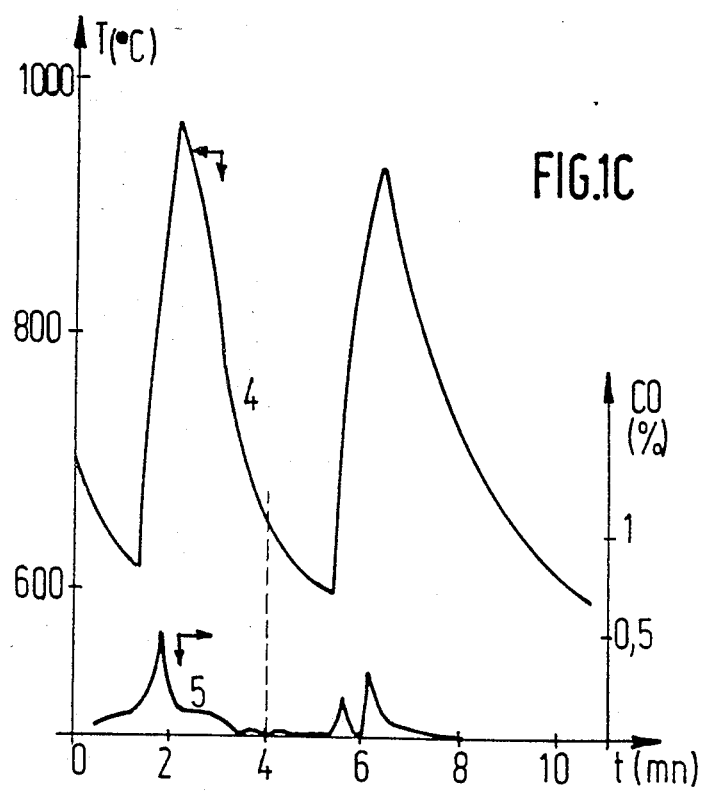

FIG. 1C shows on the curve 5 the variations of the carbon monoxide content in the smoke at the outlet of the furnace, after application of the process according to the invention, a charge being introduced at t=0 and another charge at t=4 min. The curve 4 represents the corresponding variations of the temperature of the hearth. The charges are introduced at a hearth temperature on the order of 650° C. to 700° C., the temperature dropping within about one minute to around 600° C. and then rising within about 30 seconds to a temperature on the order of 900° C. to 950° C. at which temperature an injection of water at a very high rate of flow rapidly lowers the temperature. It will be observed that the maximum content of CO is at about halfway along the curve portion 4 between 600° C. and 900° C. (at about 800° C.), the content of CO having already dropped to about 0.1% when the temperature is maximum. In any case, the concentration of CO is not higher than 0.5%, while it was higher than 1.3 in FIG. 1A (prior art).

Figure 2:
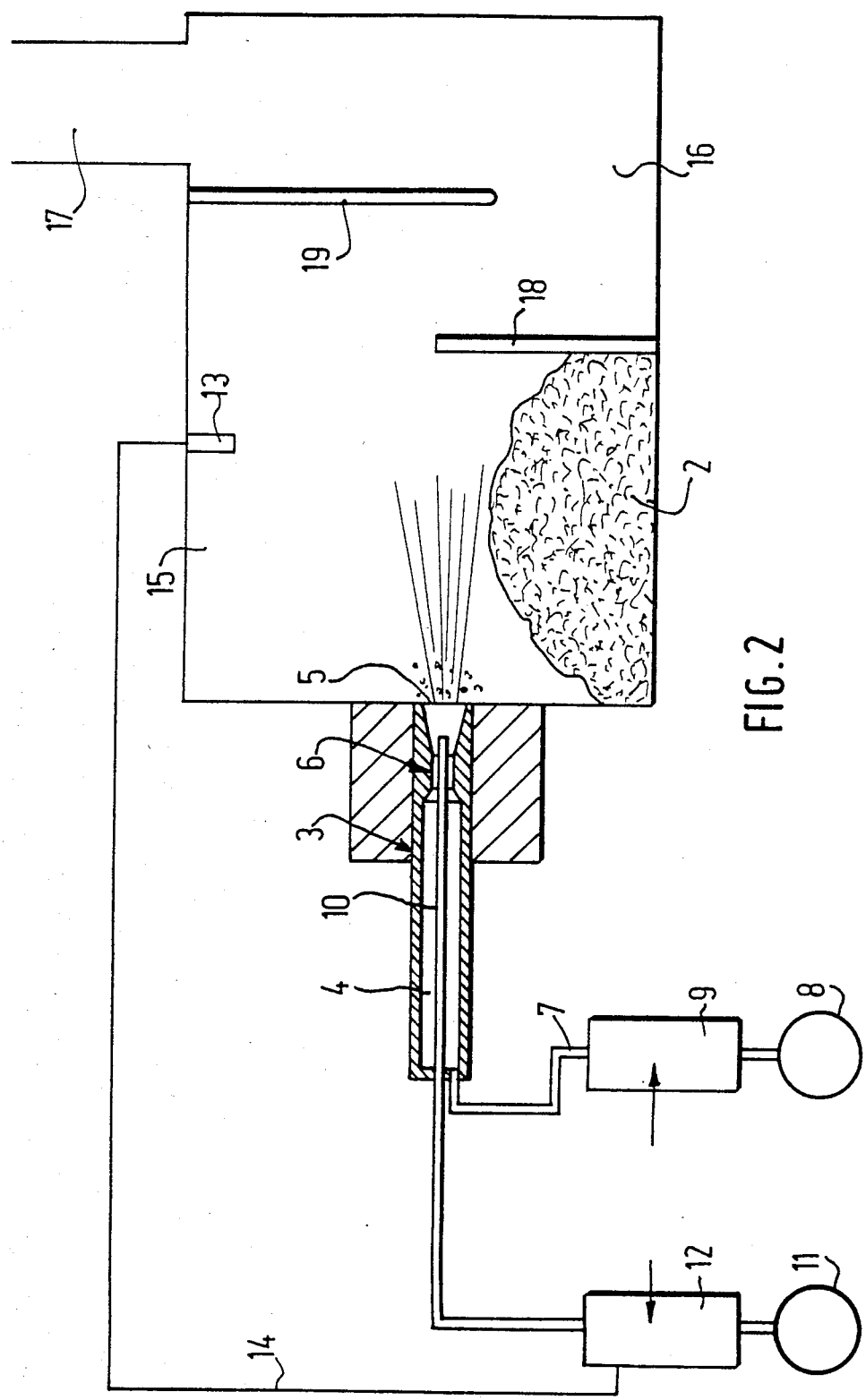
FIG. 2 is a diagrammatic vertical and longitudinal sectional view of an incinerating apparatus according to the invention.

The apparatus for incinerating waste products shown in FIG. 2 according to the invention comprises a furnace 1, of any known type, provided with at least one burner (not shown) and in which there are introduced in a discontinuous manner, the waste products 2 to be burnt. Engaged in the furnace 1 is a nozzle 3 for injecting pure oxygen and for spraying a liquid such as, for example, water. The nozzle 3 has a hollow cylindrical body whose bore 4 communicates with the inner front surface 5 of the nozzle 3 through a convergent-divergent portion 6. The bore 4 is connected by a pipe 7 to a source 8 of pure oxygen and a device 9 for regulating the flow of oxygen is connected to the pipe 7.

The nozzle 3 further comprises an axial pipe 10 for spraying liquid, such as water, which extends through almost the entire length of the nozzle 3 and whose end is located preferably in the divergent downstream part of the convergent-divergent portion 6. This water spraying pipe 10 communicates with a source 11 of water under pressure through a flow-regulating device 12. A thermal probe 13 measures the temperature T in the furnace and causes, by comparison of the measured value with a set value Tc, the opening of the liquid valve when T>Tc and the closure when T<Tc. A plurality of set values may also be provided for producing liquid flows of different values (see hereinafter). The waste products are placed in a primary chamber 2 partly separated from a secondary chamber 16 by a wall 18 forming a baffle with a second wall 19 from which the smoke emerges and travels to a discharge flue 17. During each waste product incinerating cycle pure oxygen is injected which insures a superoxygenation of the atmosphere, and, in order to control the energy dissipated in the furnace, water is also sprayed during the incinerating cycle. The oxygen injected into the furnace affords the advantage of maintaining a chemically active atmosphere around the waste products in the course of volatilization, which accelerates the combustion. Further, the liquid, such as water, which is mechanically or pneumatically sprayed by the oxygen, enables the heating of the hearth to be limited since, in vaporizing above the charge, it acts as a heat pit with respect to the latter. Further, the sprayed liquid may permit, depending on its nature and the characteristics of the spraying, either the blocking of the soot particles by a mechanical effect and, consequently, the complete suppression of the pollution, or the chemical activation of the combustion by the supply of active radical species. According to a modification, the liquid may be very advantageously formed by liquid waste products to be destroyed.

The different periods of time to and $t_1$ and the injection flows are pre-set so as to optimize the operation of the incinerating apparatus carrying out the process.

Figure 3:
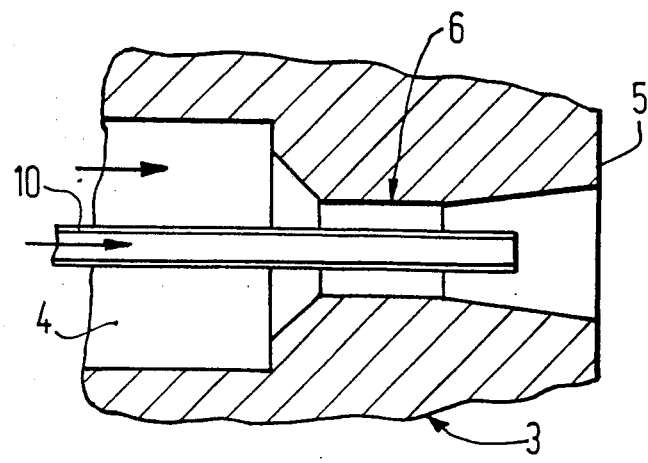
FIG. 3 is a vertical and axial sectional view, to an enlarged scale, of the nose portion of the nozzle for injecting oxygen and liquid of the apparatus shown in FIG. 1.

FIGS. 4 and 5 show the variation of the temperature T inside the furnace as a function of time t, respectively with injection of water (curve I) and without injection of water (curve II). It can be seen from FIG. 3 that the time required for the temperature of the furnace to drop to its initial threshold value of about 650° C. is 4 min. in the case of the process with injection of water (curve I) and about 7 min. in the case where there is no injection of water (curve II).

FIG. 5 illustrates more particularly the very rapid effect of the water. Indeed, the parts of the curve in full lines have been obtained with a doping with oxygen and water while the parts in dotted lines correspond to the stoppage of the injection of water. By extrapolating the curves obtained with injection of water (curve I') and without injection of water (curve II'), there are obtained results which are completely similar to those in FIG. 4. In the case of the curves of FIGS. 4 and 5, the results have been obtained with a charge of 3 kg PCI 4000 kcal/kg, for a duration of the incinerating cycle of 6 min., the liquid to be injected being water at a flow of 100 l/h and during a period of time $t_1$ equal to the period to of injection of oxygen, namely 5 min.

Other tests have shown that the best results can be obtained when the injection of water is controlled by a measurement of temperature. For this purpose, the device 10 for regulating the flow of water is connected to a thermal probe 13 placed in the furnace 1 so as to adjust the flow of water injected as a function of the temperature prevailing in the furnace. By way of example, for a duration of the incineration cycle of 12 min. oxygen was injected during a period t0 of 12 min., this being effected in two stages, namely a first stage at a high rate of flow during 6 min. and then a second stage at a low rate of flow during 6 min., as indicated in FIGS. 5 and 6. Water is injected during a period of time $t_1$ which is always less than or equal to t0 with the following characteristics: very high flow of water (170 l/h) by pulses of 30 sec. effected if the temperature T in the furnace exceeds 900° C., high flow (100 l/h) for a temperature of the furnace of between 850° C. and 900° C., and low flow (70 l/h) for a temperature of the furnace of between 850° C. and 750° C.

The diagrams of FIGS. 6 and 7 illustrate the cycles obtained, the cycle shown in FIG. 6 corresponding to waste products which are very easy to incinerate while that shown in FIG. 7 corresponds to waste products very difficult to incinerate. The curves in full line correspond to the variation of the oxygen flow with respect to time while those in dotted lines correspond to the flow of water during each cycle.

Although, in the foregoing examples of the carrying out of the process according to the invention, water was used as the liquid sprayed in the furnace, it will be understood that there may be employed any other appropriate liquid suitable for such an application and chemically reacting, or not reacting, with the incinerated waste products.

We claim:

1. Process for incinerating waste products in a furnace in which a comburent and sprayed water are injected into the furnace, characterized in that the introduction of the waste products in the furnace is effected by successive charges and comprises, for each charge of waste products, the following steps:

lowering the temperature of the hearth to around 650° C., introducing the charge to be incinerated, injecting oxygen at least in the zone located between the charge and 20 cm above the latter, preferably at sonic speed so as to immediately oxidize the carbon and the oxygen formed by cracking the pyrolysis gas above about 450° C., the presence of oxygen very rapidly producing a rise in temperature of the hearth above 750° C., beyond which temperature the carbon monoxide which could be possibly formed is immediately oxidized in the form of carbon dioxide, water being vaporized when the temperature in the furnace becomes higher than about 750° C., by spraying by means of oxygen in such manner, on one hand, as to produce active oxygen by thermal cracking and accelerate the oxydation of C, CO and H and, on the other hand, as to maintain a temperature in the furnace which does not become substantially higher than about 850° C., by absorption of heat upon its vaporization.

2. Process according to claim 1, characterized in that the oxygen and/or the liquid is injected with one and the same rate of flow during an incinerating cycle.

3. Process according to claim 1, characterized in that the oxygen and/or the liquid is injected with different successive rates of flow during an incinerating cycle.

4. Process according to any one of the claims 1 to 3, characterized in that the liquid injected is itself formed by waste products to be incinerated.

5. Apparatus for incinerating waste products of the type employing a discontinuous charging and a lively combustion, comprising a furnace in the hearth of which are charged the waste products in a discontinuous manner, characterized in that it comprises a nozzle (3) for injecting pure oxygen and pneumatically or mechanically spraying a liquid, said nozzle (3) opening into the furnace (1) and being placed in the walls of the furnace in such manner that the jet of oxygen is injected at least in a zone located between the waste products and about 20 cm above the waste products.

6. Apparatus according to claim 5, characterized in that the nozzle (3) comprises a hollow cylindrical body having a bore (4) which communicates with the inner front surface (5) of the nozzle (3) through a convergent-divergent (6) and it further contains an axial pipe (10) for spraying liquid, such as water, which extends through nearly the entire length of the nozzle (3).

7. Apparatus according to claim 6, characterized in that the end of the nozzle (3) is located in the divergent downstream part of the convergent-divergent (6).

8. Apparatus according to any one of the claims 5 to 7, characterized in that the nozzle (3) is connected to a source of oxygen (8) and to a source of liquid under pressure (11) respectively through flow-regulating devices (9,12).

9. Apparatus according to claim 8, characterized in that the device (12) for regulating the flow of the liquid is connected to a thermal probe (13) placed in the furnace (1).

* * * * *